(12) United States Patent
Van Buskirk, II et al.

(10) Patent No.: US 9,256,613 B2
(45) Date of Patent: *Feb. 9, 2016

(54) SYSTEMS, METHODS, AND COMPUTER PROGRAM PRODUCTS FOR SECURE MULTI-ENTERPRISE STORAGE

(71) Applicant: International Business Machines Corporation, Armonk, NY (US)

(72) Inventors: Ronald E. Van Buskirk, II, Folsom, CA (US); David L. Wright, Sacramento, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/714,278

(22) Filed: May 16, 2015

(65) Prior Publication Data

US 2015/0248433 A1    Sep. 3, 2015

Related U.S. Application Data

(63) Continuation of application No. 14/052,638, filed on Oct. 11, 2013, now Pat. No. 9,047,303, which is a continuation of application No. 13/039,244, filed on Mar. 2, 2011, now abandoned.

(51) Int. Cl.
*G06F 17/30* (2006.01)
*G06F 21/62* (2013.01)
(Continued)

(52) U.S. Cl.
CPC ...... *G06F 17/30156* (2013.01); *G06F 17/3015* (2013.01); *G06F 17/30085* (2013.01); *G06F 17/30117* (2013.01); *G06F 17/30864* (2013.01); *G06F 21/6218* (2013.01);

(Continued)

(58) Field of Classification Search
CPC .......... G06F 17/302; G06F 17/30156
USPC ........................................... 707/827
See application file for complete search history.

(56) References Cited

U.S. PATENT DOCUMENTS 6,625,592 B1    9/2003   Dyer et al.
7,461,260 B2   12/2008   Drews et al.
(Continued)

FOREIGN PATENT DOCUMENTS

JP        2007334417 A    12/2007

OTHER PUBLICATIONS

Chen et al., "On the (Im) Practicality of Securing Untrusted Computing Clouds with Cryptography," Stony Brook Network Security and Applied Cryptography Lab, Feb. 24, 2010; pp. 1-20.

(Continued)

*Primary Examiner* — Cheryl Lewis
(74) *Attorney, Agent, or Firm* — Zilka-Kotab, PC

(57) ABSTRACT

In one embodiment, a computer program product for storing data to a storage network includes a computer readable storage medium having program instructions embodied therewith, the program instructions being executable by a computer to cause the computer to receive a plurality of data identifiers (IDs) from multiple data providers, each data ID being associated with one of a plurality of files, store the plurality of data IDs to a database, identify any duplicate data IDs in the database to determine if any of the plurality of files associated with the plurality of data IDs are non-confidential, receive one of the files having a duplicate data ID, and store the file having the duplicate data ID to a storage network.

20 Claims, 5 Drawing Sheets

(51) Int. Cl.
*H04L 29/08* (2006.01)
*H04L 9/32* (2006.01)
*H04L 29/06* (2006.01)

(52) U.S. Cl.
CPC ......... *G06F 21/6227* (2013.01); *H04L 9/3242* (2013.01); *H04L 67/1097* (2013.01); *H04L 63/123* (2013.01); *H04L 2209/24* (2013.01)

(56) References Cited

U.S. PATENT DOCUMENTS

| | | |
|---|---|---|
| 8,612,400 B2 | 12/2013 | Van Buskirk, II et al. |
| 9,047,303 B2 | 6/2015 | Van Buskirk, II et al. |
| 2004/0059605 A1* | 3/2004 | Rubin et al. .......... G06F 19/322 705/2 |
| 2006/0171523 A1 | 8/2006 | Greenwell |
| 2006/0191020 A1 | 8/2006 | Miller |
| 2008/0077638 A1 | 3/2008 | Monk et al. |
| 2008/0098083 A1 | 4/2008 | Shergill et al. |
| 2010/0161759 A1 | 6/2010 | Brand |
| 2010/0199042 A1 | 8/2010 | Bates et al. |
| 2010/0211782 A1 | 8/2010 | Auradkar et al. |
| 2010/0274784 A1 | 10/2010 | Acharya |
| 2010/0332454 A1 | 12/2010 | Prahlad et al. |
| 2011/0082841 A1 | 4/2011 | Christiaens et al. |
| 2011/0178996 A1 | 7/2011 | Pendlebury et al. |
| 2012/0023107 A1 | 1/2012 | Nachnani et al. |
| 2012/0109933 A1 | 5/2012 | Kravets |
| 2012/0226722 A1 | 9/2012 | Van Buskirk, II et al. |
| 2012/0239632 A1 | 9/2012 | Van Buskirk, II et al. |
| 2014/0046913 A1 | 2/2014 | Van Buskirk, II et al. |

OTHER PUBLICATIONS

Final Office Action from U.S. Appl. No. 13/039,244, dated Jun. 12, 2013.
Final Office Action from U.S. Appl. No. 13/484,211, dated May 15, 2013.
Non-Final Office Action from U.S. Appl. No. 13/039,244, dated Oct. 9, 2012.
Non-Final Office Action from U.S. Appl. No. 13/484,211, dated Nov. 7, 2012.
Notice of Allowance from U.S. Appl. No. 13/039,244, dated Jul. 22, 2013.
Notice of Allowance from U.S. Appl. No. 13/484,211, dated Aug. 12, 2013.
Notice of Allowance from U.S. Appl. No. 14/052,638, dated Jan. 28, 2015.
Popa et al., "Enabling Security in Cloud Storage SLAs with CloudProof," MIT, Microsoft Research, USENIX Annual Technical Conference, Jun. 2011, pp. 1-12.
Van Buskirk et al., U.S. Appl. No. 13/039,244, filed Mar. 2, 2011.
Van Buskirk et al., U.S. Appl. No. 13/484,211, filed May 30, 2012.
Van Buskirk et al., U.S. Appl. No. 14/052,638, filed Oct. 11, 2013.

* cited by examiner

SYSTEMS, METHODS, AND COMPUTER PROGRAM PRODUCTS FOR SECURE MULTI-ENTERPRISE STORAGE

RELATED APPLICATIONS

This application is a continuation of U.S. patent application Ser. No. 14/052,638, filed Oct. 11, 2013, now U.S. Pat. No. 9,047,303, which is a continuation of U.S. patent application Ser. No. 13/039,244, abandoned, filed Mar. 2, 2011, which are herein incorporated by reference.

BACKGROUND

The present invention relates to storage systems and networks, and more particularly, this invention relates to de-duplication of non-confidential files in cloud storage systems and networks.

Cloud storage is growing at a phenomenal rate, owing in part to its cost efficient model and ease in implementation. However, one major drawback for current cloud storage solutions is that many users may not want to risk putting confidential information out on a network controlled by another entity. However, corporate storage needs are increasing exponentially, with no end in storage demands in sight for the near future. For large corporations or entities that have petabytes of data storage, if even a small fraction of that data could be moved to a less expensive cloud storage solution from conventional storage solutions, millions of dollars could be saved each year.

Current storage solutions include compressing and de-duplicating storage, which save significant amounts of storage space as compared to other conventional storage solutions. However, even this tightly compacted storage is expensive to maintain. If multiple corporations or entities worked together to store all duplicated storage items in a shared (e.g., a cloud storage) solution, then each of the entities would save money. However, if any of the corporations or entities encrypt the items they store, then de-duplication is not possible. However, if the corporation or entities do not encrypt their data, then the corporations or entities are putting that data at risk, possibly allowing access to confidential information in a cloud, which is controlled by a third party entity.

BRIEF SUMMARY

In one embodiment, a computer program product for storing data to a storage network includes a computer readable storage medium having program instructions embodied therewith, the program instructions being executable by a computer to cause the computer to receive a plurality of data identifiers (IDs) from multiple data providers, each data ID being associated with one of a plurality of files, store the plurality of data IDs to a database, identify any duplicate data IDs in the database to determine if any of the plurality of files associated with the plurality of data IDs are non-confidential, receive one of the files having a duplicate data ID, and store the file having the duplicate data ID to a storage network.

In another embodiment, a system includes a processor and logic integrated with and/or executable by the processor, the logic being configured to receive a data ID associated with each of a plurality of files from multiple data providers, store the data ID associated with each of the plurality of files to a database, identify any duplicate data IDs in the database to determine if any of the plurality of files associated with the data IDs are non-confidential, receive one of the files having a duplicate data ID, and store the file having the duplicate data ID to a storage network.

According to another embodiment, a method includes receiving a data ID associated with each of a plurality of files from multiple data providers, storing the data ID associated with each of the plurality of files to a database, identifying any duplicate data IDs in the database to determine if any of the plurality of files associated with the data IDs are non-confidential, receiving one of the files having a duplicate data ID, and storing the file having the duplicate data ID to the storage network.

Other aspects and embodiments of the present invention will become apparent from the following detailed description, which, when taken in conjunction with the drawings, illustrate by way of example the principles of the invention.

DETAILED DESCRIPTION

Figure 1:
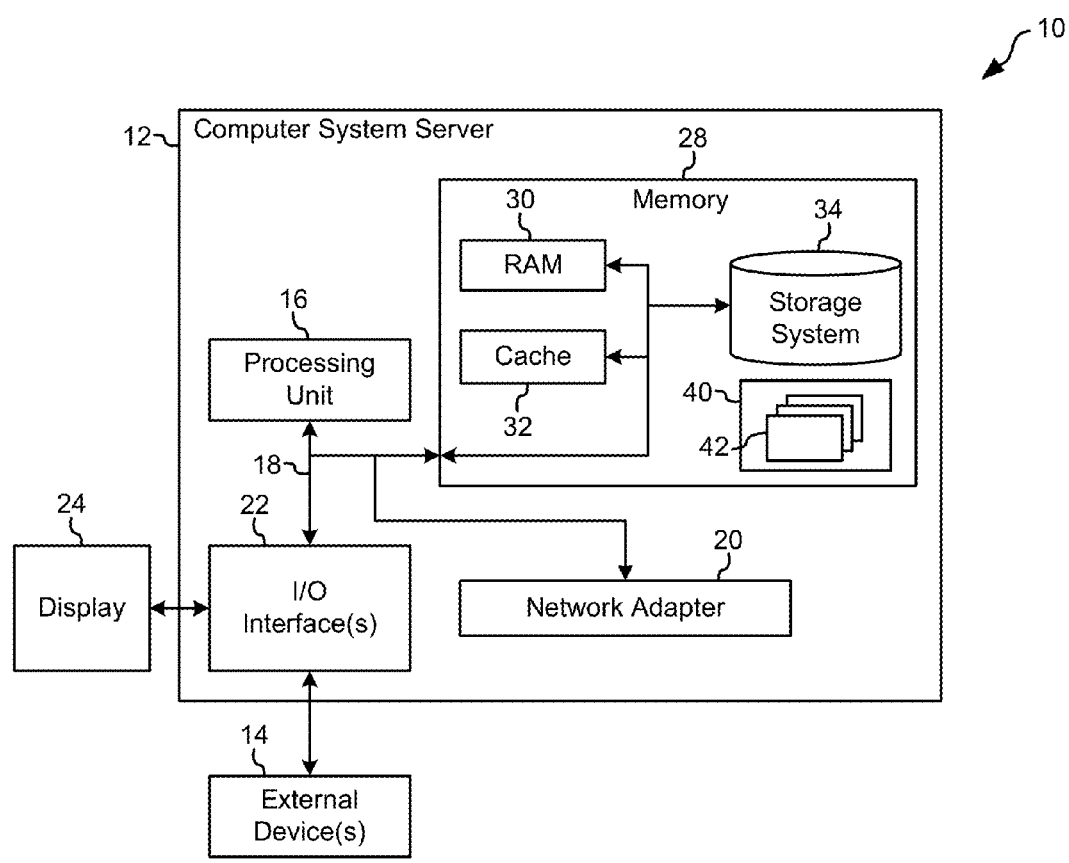
FIG. 1 depicts a cloud computing node, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of storage systems which allow data providers to share non-confidential information without marking confidential information on their enterprise systems. For example, in one non-limiting embodiment, multiple entities can share lists of data identifiers of files on their enterprise systems, duplicate data identifiers can be identified (which indicates that the files associated with the data identifiers are non-confidential since they appear on multiple entities' enterprise systems), and those files having duplicate data identifiers may be stored in the storage network without exposing any confidential data from any of the entities' enterprise systems.

In one general embodiment, a computer program product for storing data to a storage network includes a non-transitory computer readable storage medium having computer readable program code embodied therewith, the computer readable program code including computer readable program code configured to receive a plurality of data identifiers (IDs) from multiple data providers, each data ID being associated with one of a plurality of files, computer readable program code configured to store the plurality of data IDs to a database, computer readable program code configured to identify any duplicate data IDs in the database to determine if any of the plurality of files associated with the plurality of data IDs are non-confidential, computer readable program code configured to receive one of the files having a duplicate data ID, and computer readable program code configured to store the file having the duplicate data ID to a storage network.

In another general embodiment, a system includes a processor and logic integrated with and/or executable by the processor, the logic being configured to receive a data ID associated with each of a plurality of files from multiple data providers, store the data ID associated with each of the plurality of files to a database, identify any duplicate data IDs in the database to determine if any of the plurality of files associated with the data IDs are non-confidential, receive one of the files having a duplicate data ID, and store the file having the duplicate data ID to a storage network.

According to another general embodiment, a method includes receiving a data ID associated with each of a plurality of files from multiple data providers, storing the data ID associated with each of the plurality of files to a database, identifying any duplicate data IDs in the database to determine if any of the plurality of files associated with the data IDs are non-confidential, receiving one of the files having a duplicate data ID, and storing the file having the duplicate data ID to the storage network.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
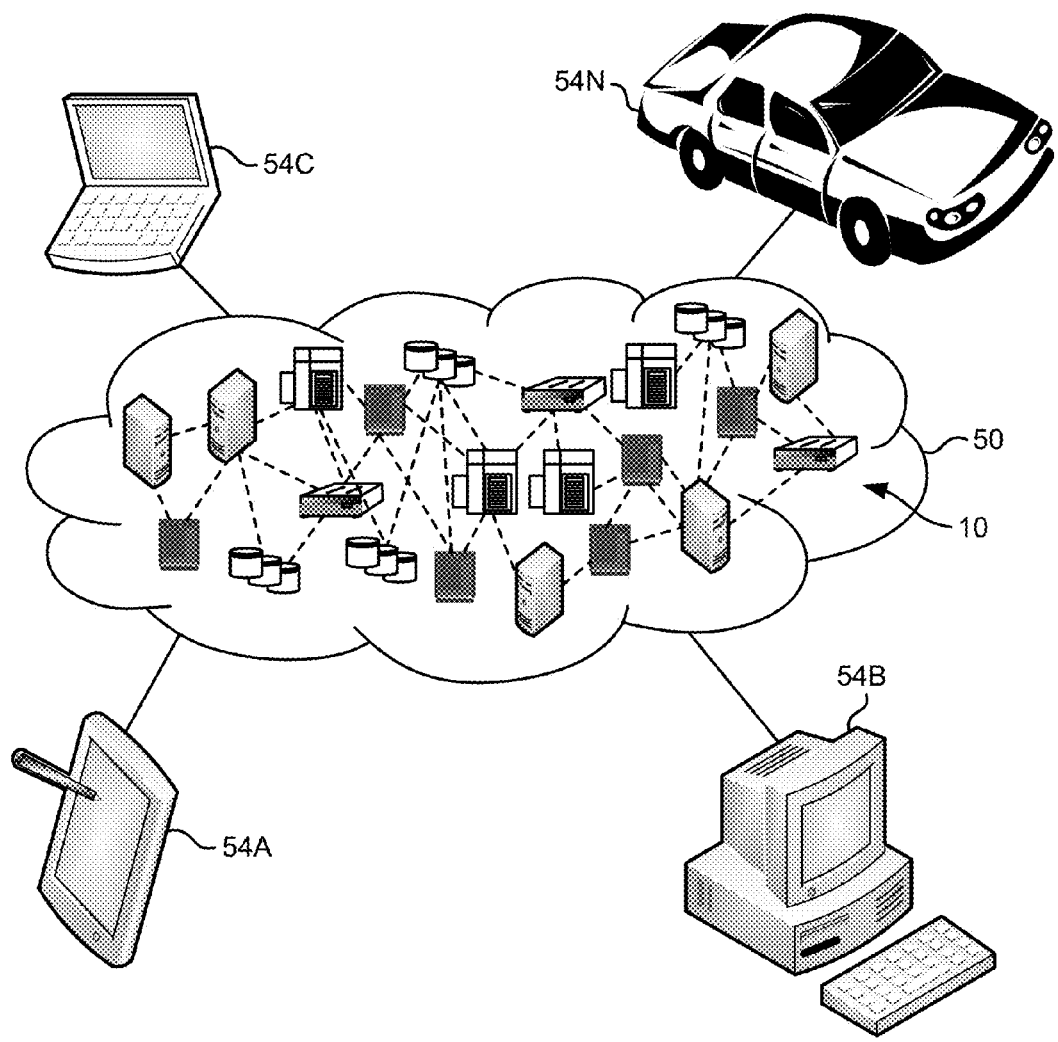
FIG. 2 depicts a cloud computing environment, according to one embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
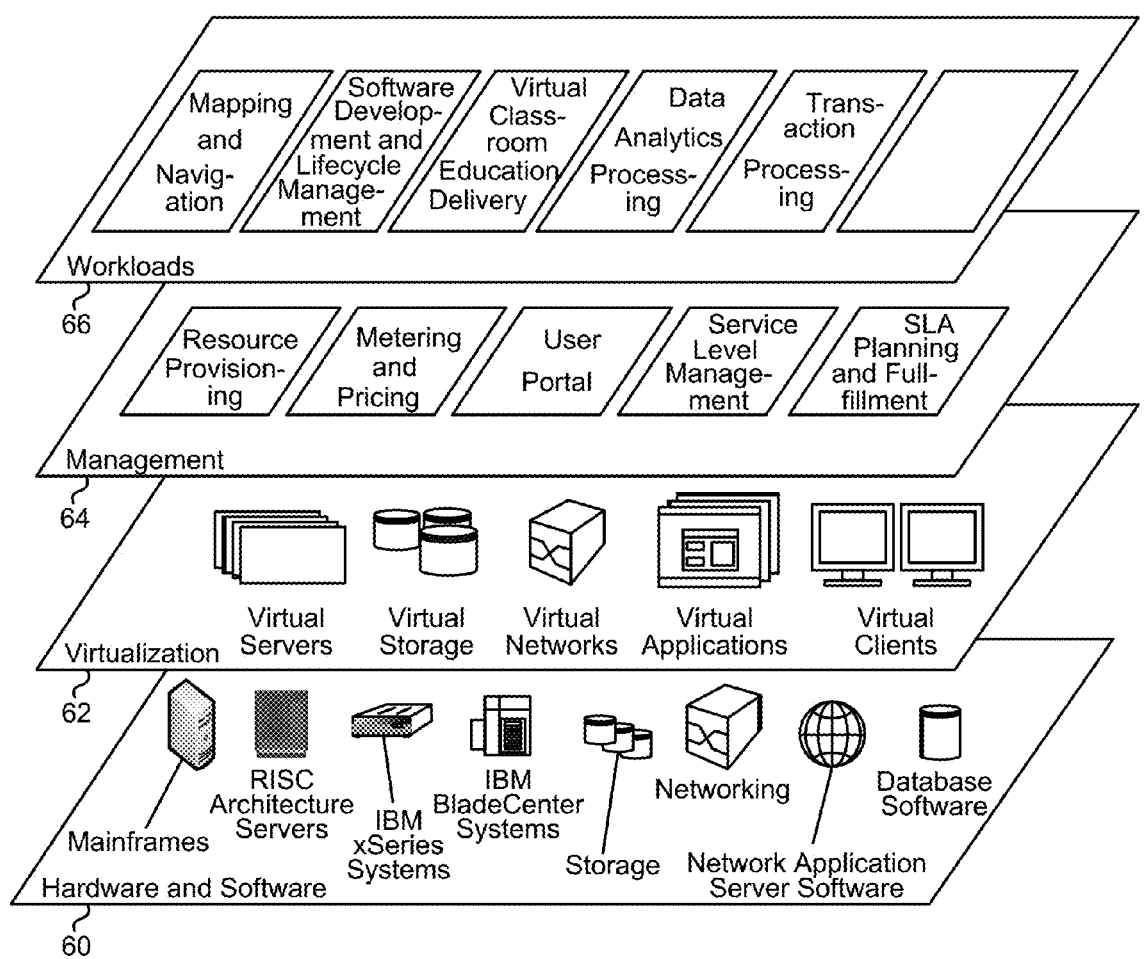
FIG. 3 depicts abstraction model layers, according to one embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; deduplicated storage; etc.

According to one embodiment, data providers, which may be businesses, corporations, persons, government agencies, other computer systems, etc., may share lists of unique data identifiers (IDs) of files on the data provider's system. In one approach, the data IDs may be cryptographic hash calculations of files on their local storage systems. Each data ID identifies a file uniquely if it is a unique file, and the data ID for two files will be the same if the files are the same. In addition, these data IDs, in one approach, prevent any unauthorized parties (e.g., a third party, malicious software, etc.) from knowing what contents each file may contain.

For example, companies A, B, C, D, E, F, and G may share hash calculations of the files in their respective systems. By knowing a certain hash calculation (e.g., 'a5cfg23') is located in Company A, C, D, and G, the storage administrator may assume that the file is non-confidential and may be de-duplicated across any of the companies providing data to the storage network.

In another embodiment, data IDs may be included from internet media content providers, such as YOUTUBE.com, AMAZON.com, FLICKR.com, FACEBOOK.com, etc., so that any data and/or files that appear on these sites may be eliminated by including hash calculations from large media content producers (e.g., YOUTUBE.com or AMAZON.com), and the data can be completely eliminated from the local storage systems of all data providers because it is known that this data is non-confidential and readily available online.

The embodiments described herein provide less expensive storage solutions while also preventing confidential information from leaving the local firewall of each data provider.

According to one exemplary embodiment, a storage network host, such as IBM, may set up a storage network which may include one or more mainframes, virtualized storage, storage devices, etc., that may provide a high-availability (HA) storage solution. The storage network host may offer storage space on this storage network to many individual data providers, even to data providers which are competitors in their marketplaces, such as AVIS and HERTZ; FORD, NISSAN, and GM; TOSHIBA, FUJITSU, and HITACHI, etc., or to any companies and/or entities which are willing to provide data to store on the storage network (and be willing to pay for it). Many of these companies and/or entities may have data and data backups that are duplicated across their enterprise systems. For example, even if the companies and/or entities used de-duplication, they would still be left with a single instance of applications, images, videos, and audio files that are duplicated across their different enterprise systems. By storing these duplicated files, applications, programs, etc., on the HA storage network with IBM, the companies and/or entities may reduce terabytes of otherwise expensive storage use on their own enterprise systems.

In some embodiments, the storage network may be implemented as a cloud storage network, in accordance with any descriptions of a cloud storage network as previously presented.

Figure 4:
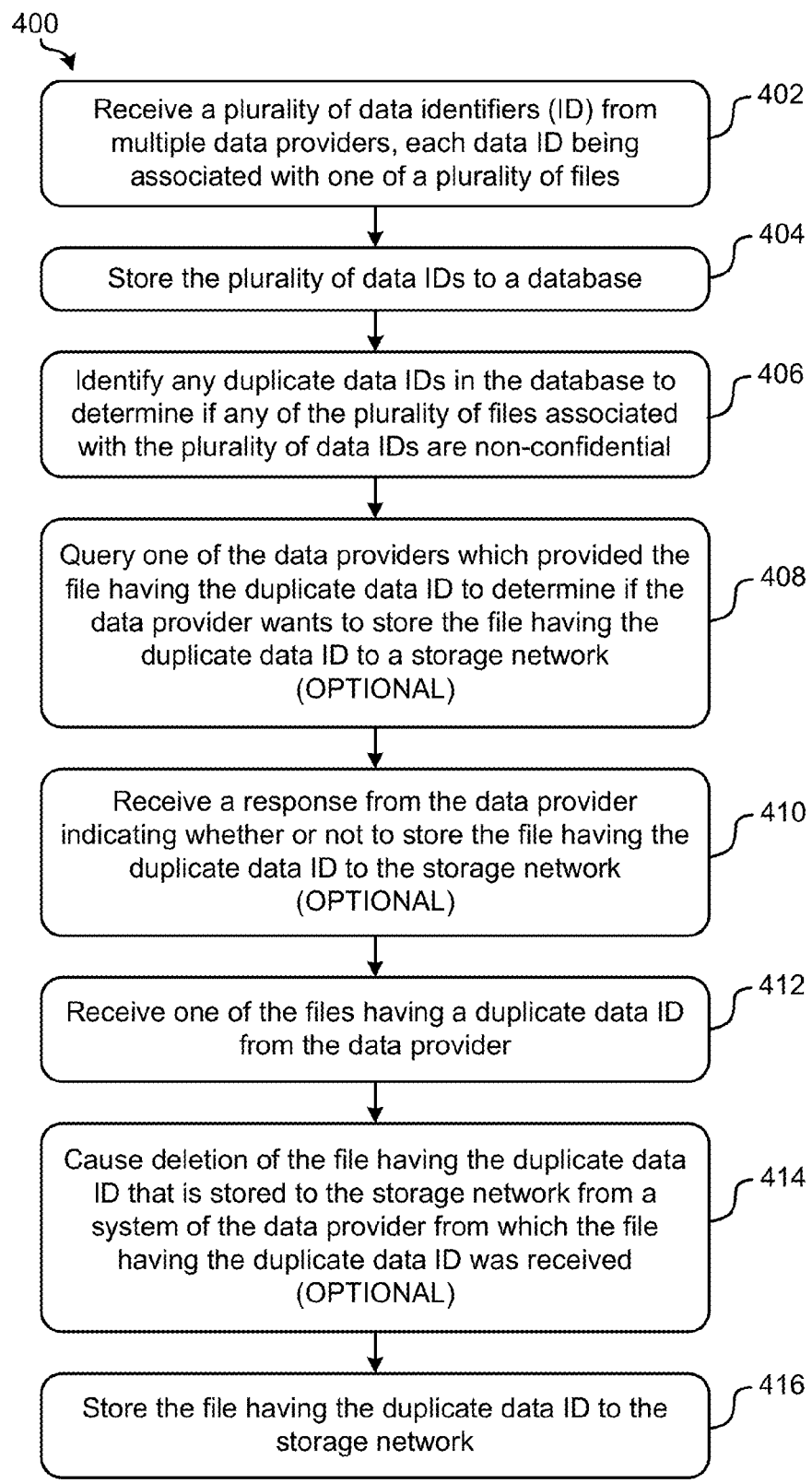
FIG. 4 shows a flowchart of a method in accordance with one embodiment.

Now referring to FIG. 4, a method 400 is shown according to one embodiment. The method 400 may be carried out in any desired environment, including those described in FIGS. 1-3, among others. Of course, more or less operations than those described below may comprise the method 400, according to various embodiments.

In operation 402, a plurality of data identifiers (IDs) are received from multiple data providers, with each data ID being associated with one of a plurality of files. These data IDs may be stored to a list, a table, a database, an array, etc., such that they may be transferred and/or analyzed. After creation, the unique data ID is associated with the file for which it was generated, such that the file and the data ID associated with the file are somehow linked, and by knowing the data ID, the file that is linked to it can be determined. Other information may be stored along with the data ID, such as filename, file location, system location, file size, file type, data provider identity, etc. However, in one embodiment, the data ID may be a one-way identifier, e.g., only those authorized to view the files would be able to determine which file is associated with a particular data ID.

In one embodiment, each individual data provider may generate the unique data ID for each of the plurality of files using an ID generating routine, guidelines, program, function, executable file, etc. In an alternative approach, a different entity, such as an entity which is hosting a storage network, may generate the data IDs for each of the plurality of files, thereby ensuring that proper data ID generation has taken place so comparisons of data IDs will result in matches when identical files are encountered.

In one embodiment, the plurality of files may be those files for which the data provider is considering storing to a storage network, all files stored to the data provider's enterprise systems, those files which the data provider thinks are not confidential, etc. The plurality of files, in one approach, may be stored on the data provider's enterprise systems, on remote storage, on another storage network, or some other location.

In another approach, the data providers may be companies and/or entities that have data to be uploaded to a storage network, or that are contemplating uploading data to the storage network.

According to one embodiment, the data ID may be unique to each different file and is only duplicated when the files are duplicates of one another, thereby ensuring that if two data IDs are duplicates, then the files associated with the data IDs are also duplicates. Of course, this may be carried out in a scheme where there is not an absolute certainty that the data IDs will not be identical with different files, such as with hashing schemes currently utilized commonly in computing systems, for example.

In one embodiment, the data ID may be generated through a cryptographic hash calculation, or any other uniquely identifying code, alphanumeric string, etc., as would be understood by one of skill in the art upon reading the present descriptions.

In another embodiment, the data IDs may be generated periodically, in response to an event, according to a schedule, only once, etc. For example, the data IDs may be generated once per day, once per week, once per month, when an amount of new files have been created, when determined to be generated by an authorized person at a data provider, when equipment changes (such as new hardware or deletion of hardware at a storage facility), etc. In this way, a data provider can be assured that they are getting the most use out of the storage network that they can, and that they are up to date as to access authority, confidentiality of files, and security of data.

In operation 404, the plurality of data IDs are stored to a database. This data base is remotely accessible such that a data provider may add or delete data IDs from the database as their files and systems change. However, in one approach where the storage network host manages the data IDs, the database may not be remotely accessible, for enhanced security and data integrity.

In one embodiment, the database may be a remotely accessible database, such as a web-hosted database, a central repository, a virtual database, etc.

According to one approach, the database may be hosted, run, managed, maintained, and/or provided by the same entity which hosts the storage network. In another approach, several databases may be created, such as one for each data provider uploading data to the storage network, one for each type of data provider, one for each data file type, date created, size, etc.

In one approach, a web service or some other remote application, as would be known by one of skill in the art, may be used to store the data IDs, in a database or any other structure as would be known by one of skill in the art.

In operation 406, any duplicate data IDs are identified in the database to determine if any of the plurality of files associated with the plurality of data IDs are non-confidential. In one approach, the identifying may be executed by the storage network host, such as by using a routine, executable file, function, etc., to compare the data IDs from any remotely accessible databases in which they are stored.

Since any duplicated data ID is assumed to have been created from two identical files, it can be assumed that if two duplicate data IDs are found on the systems of two different data providers, that the file associated with the duplicate data IDs is not confidential. This provides a method of determining non-confidential files across multiple data providers without marking individual files or collections of files as being confidential or non-confidential, which would enable unauthorized access into the systems and retrieving confidential information exponentially easier, and it is desirable to avoid this type of solution.

In optional operation 408, one of the data providers which provided the file having the duplicate data ID is queried to determine if the data provider wants to store the file having the duplicate data ID to a storage network. In this way, even if the file is determined to have been stored in another data provider's system, it is not automatically moved to the storage network. However, in some embodiments, it may be automatically moved, which is why this is an optional operation.

According to one embodiment, for example, the data provider for each file having the duplicate data ID may be queried to determine if the data provider wants to have the file stored to the storage network. When multiple data providers have duplicate files in their systems, there is a chance of removing several instances of the same files from multiple different data providers.

In optional operation 410, a response from the data provider is received indicating whether or not to store the file having the duplicate data ID to the storage network. This, in some embodiments, determines whether to store the file or not. In embodiments where it is automatically stored upon finding a duplicate data ID, this operation is omitted; thus it is an optional operation.

In another embodiment, after being queried, each data provider may send a request to store the file associated with the duplicate data ID. At this point, each data provider which chose to store the file may be tracked for billing purposes (to be explained in greater detail later), in one embodiment. In this embodiment where the data provider requests storage of the file, it may be determined whether the file currently exists on the storage network, and if so, a new instance is not created. If the file is not present, an instance of the file may be created on the storage network. In either case, the file on the data provider's enterprise systems may be deleted after successful storage on the storage network.

In operation 412, one of the files having a duplicate data ID is received. In one embodiment, it is received from the data provider which provided the response in operation 410.

The file is presumably not a file which contains confidential information, since it is a file which exists outside of the data provider from which it originated, and the data ID is identical to another file at another data provider. This is an inherent function of the data IDs, that they are unique to each file, and will only be recreated for another file if the files are identical. The presumption then is that if two identical files exist at two locations controlled by different entities, the files do not contain confidential information.

In optional operation 414, the file having the duplicate data ID that is stored to the storage network is caused to be deleted from a system of one or more of the data providers from which the data ID associated with the file having the duplicate data ID was received. For example, the file having the duplicate data ID stored on the storage network may be remotely deleted from a system of each data provider from which the duplicate data ID was received (which indicates that these data providers have the duplicate file stored to their systems), such as by the storage network administrator, the storage network itself, automatically, after a predetermined period of time, etc. In another example, the local enterprise system of one or more data providers may delete the file having the duplicate data ID upon receiving an instruction to do so from the storage network, the storage network administrator, etc. Of course, any method of causing the file having the duplicate data ID to be deleted from a system of the data provider(s) from which the data ID associated with the file having the duplicate data ID was received may be used, as would be understood by one of skill in the art upon reading the present descriptions. Furthermore, some data providers may not wish to delete the files that are stored on the storage network from their enterprise or local systems, such as for backup purposes.

In these embodiments, the file having the duplicate data ID is not caused to be deleted from the data provider's system.

In one embodiment, the file having the duplicate data ID that is stored to the storage network may be deleted from a system of a data provider from which the file having the duplicate data ID originated. In this way, the file is removed from the data provider's network, and access to the file is provided by the storage network.

In operation 416, the file having the duplicate data ID is stored to a storage network. In this way, only files which are to be stored to the storage network are transferred, thereby saving bandwidth and computing power, and saving money.

In some embodiments, the storage network may be implemented as a cloud storage network, in accordance with any descriptions of a cloud storage network as previously presented.

Figure 5:
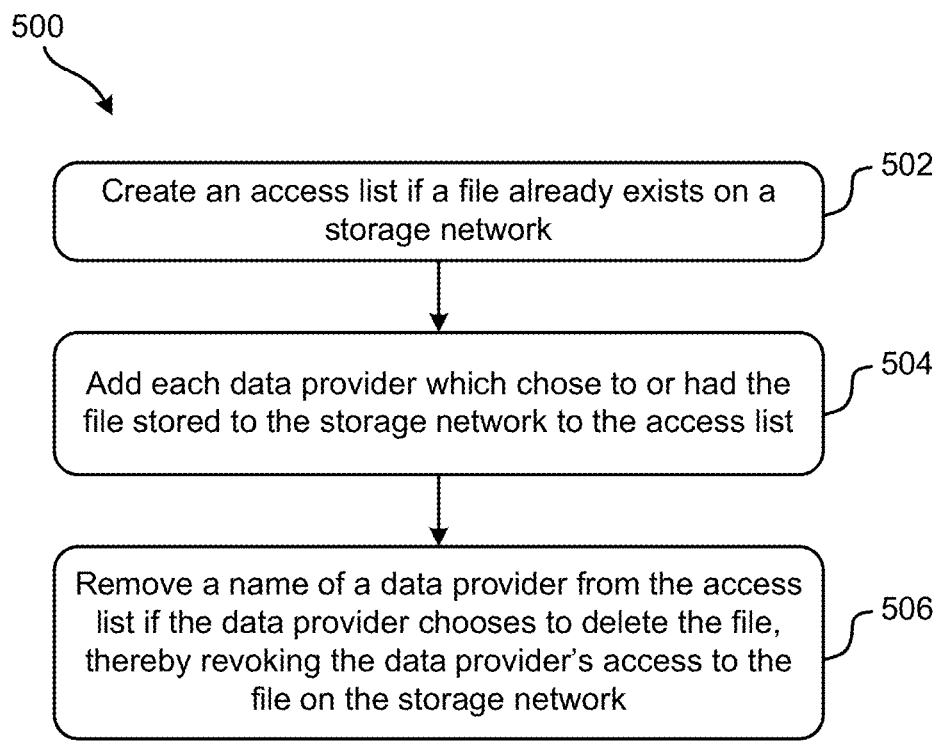
FIG. 5 shows a flowchart of a method in accordance with one embodiment.

Now referring to FIG. 5, a method 500 is shown according to one embodiment. The method 500 may be carried out in any desired environment, including those described in FIGS. 1-4, among others. Of course, more or less operations than those described below may comprise the method 500, according to various embodiments.

In operation 502, according to one embodiment, if the file already exists on the storage network, then an access list is created. The access list may list a name or some other identifier of each data provider which has authority to access the file on the storage network.

In operation 504, according to another embodiment, each data provider which chose to or had the file stored to the storage network, or in some other way has the authority to access the file, is added to the access list.

For example, in one embodiment, an access list is created for a file stored to the storage network and the access list is populated with any data providers that have authority to access the file. This may be repeated each time new files are stored to the storage network, and when files are marked for deletion by data providers.

In one approach, the access list for a file stored to the storage network may be created if more than one data provider has requested storage of the file to the storage network.

In another approach, data providers may have access to the file stored to the storage network if a data ID associated with the file stored to the storage network is received from the data providers indicating that the file was stored in a system of those data providers. Of course, other ways of determining which data providers have access to the file, and therefore populate the access list, may be used, as would be apparent to one of skill in the art upon reading the present descriptions.

In operation 506, in another embodiment, where an access list exists for a file on the storage network, if a data provider chooses to delete the file, the data provider's name or other identifier is removed from the access list, thereby revoking the data provider's access to the file on the storage network. To the data provider, it simply appears (virtually) as if the file has been deleted, but no file deletion is actually performed. However, if the data provider which chooses to delete the file is the last on the access list, then the file is actually deleted from the storage network.

In some embodiments, the storage network may be implemented as a cloud storage network, in accordance with any descriptions of a cloud storage network as previously presented.

In more approaches, methods 400 and/or 500 may be used in conjunction with techniques for storing confidential data to the storage network. In this way, any data providers who are comfortable with storage networks and storing their confidential information to storage networks could store their confidential information to the storage network (such as in a segregated manner, with encryption, etc.), whereas non-confidential information may be de-duplicated using methods 400 and/or 500. This would allow for the data provider to reduce storage costs incrementally by de-duplication, and maintain confidentiality of sensitive information.

According to one embodiment, each data provider which provides any of the plurality of files to be stored to the storage network may be charged a reduced amount of money based on an extent of sharing of the plurality of files among other data providers on the storage network. In other words, each data provider may be charged and/or billed a prorated amount for the files that are stored to the storage network based on an extent that the files are shared by other data providers.

For example, if company A has 2 TB of data stored to the storage network, and 1 TB of data is shared with three other companies and 1 TB of data is shared with four other companies, company A may be charged some percentage of what it would be charged if the data was not shared. In one embodiment, company A may be charged for 0.45 TB instead of 2 TB, since 1 TB is shared five ways (1 TB/5=0.2 TB), and the other 1 TB is shared four ways (between company A and three other companies) (1 TB/4=0.25 TB), and 0.2 TB+0.25 TB=0.45 TB. This charging method may be employed regardless of the actual billing rate per unit of data storage, in this case represented by 1 TB.

In another example, company A may be charged for 0.495 TB instead of 2 TB, based on an amount of sharing of the files on the storage network and an add-on fee. This may be based on a method of reducing billing based on an amount of shared data, plus a 10% fee. Of course, any fee may be added as desired by the storage network host. Continuing the example above, company A may be charged for 1 TB shared five ways (1 TB/5+10%=0.2 TB+(10%×0.2 TB)=0.22 TB), and 1 TB shared four ways (1 TB/4+10%=0.25 TB+(10%×0.25 TB)=0.275 TB), and 0.22 TB+0.275 TB=0.495 TB. Of course, any other fee, add-on, multiplier, etc., may be applied to the calculated storage amount, as would be understood by one of skill in the art.

In another embodiment, the shared rates may be determined with an added charge, a per-access fee, tiered pricing based on the availability of the stored data, storage costs for the shared data, or any other pricing, billing, and/or charging method as would be understood by one of skill in the art.

In another method, a data provider may have reduced billing and/or charging based on a percentage of total enterprise data that is stored to the storage network.

Not only does this reduce the cost of storage for the data providers, it also encourages shared data storage. Increased shared storage results in increased energy savings (individual data providers no longer provide storage for duplicated data), decreased storage costs, and the ability to more easily upgrade storage components, since the host company would be responsible for any such upgrades and would be able to more swiftly and efficiently upgrade the storage network components and systems.

According to embodiments presented herein, it is anticipated that the vast majority of data on any data provider's enterprise systems would have data IDs which would not be candidates for moving the data to the storage network. However, this does not preclude the data provider from storing the data to the storage network; there just would not be a de-duplication incentive to do so, according to most embodiments.

In some more embodiments, data or files which are not de-duplicated on the storage network may be stored to the storage network, and since it is not obvious that these files (data) are not confidential, they may be stored as encrypted data. The encryption removes the de-duplication incentive, but protects any files that may be confidential from being viewed by others not having authority to access them on the storage network.

For example, since every file has a unique data ID, files that are non-confidential (e.g., notepad.exe, winzip.exe, YOUTUBE.COM videos, mp3 files, etc.) that are located at different locations in the enterprise may be located by this data ID and stored in a central location (e.g., the storage network, a local enterprise storage server, etc.). The vast majority of confidential files are generally not located in more than one location, and therefore are not moved into shared central storage, according to most approaches.

According to one embodiment, a computer program product for storing data to a storage network comprises a computer readable storage medium having computer readable program code embodied therewith. The computer readable program code comprises computer readable program code configured to: receive a plurality of data identifiers (ID) from multiple data providers, each data ID being associated with one of a plurality of files, store the plurality of data IDs to a database, identify any duplicate data IDs in the database to determine if any of the plurality of files associated with the plurality of data IDs are non-confidential, receive one of the files having a duplicate data ID, and store the file having the duplicate data ID to a storage network.

In more approaches, the data ID may be unique to each different file and is only duplicated when the files are duplicates of one another. In a further approach, the data ID may be a cryptographic hash.

According to another approach, the database may be a remotely accessible database, as previously described.

In one embodiment, the computer program product may further comprise computer readable program code configured to: query one of the data providers which provided the file having the duplicate data ID to determine if the data provider wants to store the file having the duplicate data ID to the storage network, and receive a response from the data provider indicating whether or not to store the file having the duplicate data ID to the storage network.

In another embodiment, the computer program product may further comprise computer readable program code configured to cause deletion of the file having the duplicate data ID that is stored to the storage network from a system of one of the data providers from which the data ID associated with the file having the duplicate data ID was received.

According to yet another embodiment, the computer program product may further comprise computer readable program code configured to: create an access list for a file stored to the storage network, and populate the access list with any data providers that have authority to access the file. In one approach, the access list may be created if more than one data provider has requested storage of the file to the storage network.

In another embodiment, data providers may have access to the file stored to the storage network if a data ID associated with the file stored to the storage network is received from the data providers indicating that the file was stored in a system of those data providers.

In another embodiment, the computer program product may further comprise computer readable program code configured to: scan one or more publicly accessible media content providers to determine if any of the plurality of files exist on the one or more publicly accessible media content providers, and provide access to any of the plurality of files that exist on the one or more publicly accessible media content providers from the one or more publicly accessible media content providers with the proviso that any of the plurality of files that exist on the one or more publicly accessible media content providers are not stored to the storage network.

According to one approach, each data provider which provides any of the plurality of files to be stored to the storage network may be charged a reduced amount of money based on an extent of sharing of the plurality of files among other data providers on the storage network.

In some embodiments, the storage network may be implemented as a cloud storage network, in accordance with any descriptions of a cloud storage network as previously presented.

In one preferred embodiment, a system comprises a memory for storing data and a processor for securely processing the data. By securely, what is meant is that the processing is performed in a manner which makes it difficult to steal, corrupt, manipulate or otherwise intercept data. Processing the data comprises receiving a data identifier (ID) associated with each of a plurality of files from multiple data providers, storing the data ID associated with each of the plurality of files to a database, identifying any duplicate data IDs in the database to determine if any of the plurality of files associated with the data IDs are non-confidential, receiving one of the files having a duplicate data ID, and storing the file having the duplicate data ID to a storage network.

In various embodiments, the data ID may be unique to each different file and is only duplicated when the files are duplicates of one another, the unique data ID may be a cryptographic hash, a data provider may provide at least one file having the duplicate data ID, and the processing may further comprise querying the data provider to determine if the data provider wants to store the file having the duplicate data ID on the storage network, and receiving a response from the data provider indicating whether or not to store the file having the duplicate data ID to the storage network.

In more approaches, the processing may include causing deletion of the file having the duplicate data ID that is stored to the storage network from a system of one of the data providers from which the data ID associated with the file having the duplicate data ID was received.

In another approach, the processing may further comprise creating an access list for a file stored to the storage network, and populating the access list with any data providers that have authority to access the file stored to the storage network, wherein the access list is created if more than one data provider has requested storage of the file to the storage network.

In a further embodiment, any data providers may have access to the file stored to the storage network if a data ID associated with the file is received from those data providers indicating that the file was stored in a system of those data providers.

According to yet another embodiment, the processing may include scanning one or more publicly accessible media content providers to determine if any of the plurality of files exist on the one or more publicly accessible media content providers, and providing access to any of the plurality of files that exist on the one or more publicly accessible media content providers from the one or more publicly accessible media content providers with the proviso that any of the plurality of files that exist on the one or more publicly accessible media content providers are not stored to the storage network.

In some embodiments, the storage network may be implemented as a cloud storage network, in accordance with any descriptions of a cloud storage network as previously presented.

According to one embodiment, a system includes logic adapted for receiving a ID associated with each of a plurality of files from multiple data providers, logic adapted for storing the data ID associated with each of the plurality of files to a database, logic adapted for identifying any duplicate data IDs in the database to determine if any of the plurality of files associated with the data IDs are non-confidential, logic adapted for querying one of the data providers which provided the file having the duplicate data ID to determine if the data provider wants to store the file having the duplicate data ID to a storage network, logic adapted for receiving a response from the data provider indicating whether or not to store the file having the duplicate data ID to the storage network, logic adapted for receiving one of the files having a duplicate data ID from the data provider, logic adapted for storing the file having the duplicate data ID to the storage network, and logic adapted for causing deletion of the file having the duplicate data ID that is stored to the storage network from a system of the data provider from which the file having the duplicate data ID was received, wherein the data ID is unique to each different file and is only duplicated when the files are duplicates of one another, and the data ID is a cryptographic hash. In some embodiments, the storage network may be implemented as a cloud storage network, in accordance with any descriptions of a cloud storage network as previously presented.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product for storing data to a storage network, the computer program product comprising a non-transitory computer readable storage medium having program instructions embodied therewith, the program instructions being executable by a computer to cause the computer to:
   receive, by the computer, a plurality of data identifiers (IDs) from multiple data providers, each data ID being associated with one of a plurality of files;
   store, by the computer, the plurality of data IDs to a database;
   identify, by the computer, any duplicate data IDs in the database to determine if any of the plurality of files associated with the plurality of data IDs are non-confidential;
   receive, by the computer, one of the files having a duplicate data ID; and
   store, by the computer, the file having the duplicate data ID to a storage network.

2. The computer program product as recited in claim 1, wherein the data ID is unique to each different file and is only duplicated when the files are duplicates of one another.

3. The computer program product as recited in claim 1, wherein the data ID is a cryptographic hash.

4. The computer program product as recited in claim 1, wherein the database is a remotely accessible database.

5. The computer program product as recited in claim 1, comprising program instructions executable by the computer to cause the computer to cause deletion of the file having the duplicate data ID that is stored to the storage network from a system of one of the data providers from which the data ID associated with the file having the duplicate data ID was received.

6. The computer program product as recited in claim 1, comprising:
   program instructions executable by the computer to cause the computer to create an access list for a file stored to the storage network; and
   program instructions executable by the computer to cause the computer to populate the access list with any data providers that have authority to access the file.

7. The computer program product as recited in claim 6, wherein the access list is created when more than one data provider has requested storage of the file to the storage network.

8. The computer program product as recited in claim 6, wherein data providers have access to the file stored to the storage network when a data ID associated with the file stored to the storage network is received from the data providers indicating that the file was stored in a system of those data providers.

9. The computer program product as recited in claim 1, wherein each data provider which provides any of the plurality of files to be stored to the storage network is charged a reduced amount of money based on an extent of sharing of the plurality of files among other data providers on the storage network.

10. The computer program product as recited in claim 1, wherein the storage network is implemented as a cloud storage network.

11. A system, comprising a hardware processor and logic integrated with and/or executable by the processor, the logic being configured to:
   receive a data identifier (ID) associated with each of a plurality of files from multiple data providers;
   store the data ID associated with each of the plurality of files to a database;
   identify any duplicate data IDs in the database to determine if any of the plurality of files associated with the data IDs are non-confidential;
   receive one of the files having a duplicate data ID; and
   store the file having the duplicate data ID to a storage network.

12. The system as recited in claim 11, wherein the data ID is unique to each different file and is only duplicated when the files are duplicates of one another.

13. The system as recited in claim 11, wherein the data ID is a cryptographic hash.

14. The system as recited in claim 11, wherein the logic is further configured to:
- query one of the data providers which provided the file having the duplicate data ID to determine if the data provider wants to store the file having the duplicate data ID to the storage network; and
- receive a response from the data provider indicating whether or not to store the file having the duplicate data ID to the storage network.

15. The system as recited in claim 11, wherein the logic is further configured to cause deletion of the file having the duplicate data ID that is stored to the storage network from a system of one of the data providers from which the data ID associated with the file having the duplicate data ID was received.

16. The system as recited in claim 11, wherein the logic is further configured to:
- create an access list for a file stored to the storage network; and
- populate the access list with any data providers that have authority to access the file stored to the storage network, wherein the access list is created when more than one data provider has requested storage of the file to the storage network.

17. The system as recited in claim 16, wherein data providers have access to the file stored to the storage network when a data ID associated with the file is received from those data providers indicating that the file was stored in a system of those data providers.

18. The system as recited in claim 16, wherein the storage network is implemented as a cloud storage network.

19. A method:
- receiving, by a processor, a data identifier (ID) associated with each of a plurality of files from multiple data providers;
- storing the data ID associated with each of the plurality of files to a database;
- identifying any duplicate data IDs in the database to determine if any of the plurality of files associated with the data IDs are non-confidential;
- receiving one of the files having a duplicate data ID; and
- storing the file having the duplicate data ID to a storage network.

20. The method as recited in claim 19, comprising:
- querying one of the data providers which provided the file having the duplicate data ID to determine if the data provider wants to store the file having the duplicate data ID to the storage network; and
- receiving a response from the data provider indicating whether or not to store the file having the duplicate data ID to the storage network.

* * * * *